(12) United States Patent
Khalidi

(10) Patent No.: US 7,430,523 B1
(45) Date of Patent: Sep. 30, 2008

(54) AUTOMATED COMPETITIVE BIDDING SYSTEM AND PROCESS

(76) Inventor: Tariq Khalidi, 2893 Sunrise Blvd., Suite 211, Rancho Cordova, CA (US) 95742

( * ) Notice: Subject to any disclaimer, the term of this patent is extended or adjusted under 35 U.S.C. 154(b) by 394 days.

(21) Appl. No.: 09/592,087

(22) Filed: Jun. 12, 2000

(51) Int. Cl.
*G06Q 40/00* (2006.01)

(52) U.S. Cl. .......................... 705/26; 705/37
(58) Field of Classification Search ............. 705/1, 705/8, 37, 26; 751/10
See application file for complete search history.

(56) References Cited

U.S. PATENT DOCUMENTS

| | | | | |
|---|---|---|---|---|
| 5,243,515 | A * | 9/1993 | Lee | 705/37 |
| 5,802,493 | A * | 9/1998 | Sheflott et al. | 705/1 |
| 6,356,909 | B1 * | 3/2002 | Spencer | 707/10 |
| 6,397,197 | B1 * | 5/2002 | Gindlesperger | 705/37 |
| 6,446,053 | B1 * | 9/2002 | Elliott | 705/400 |
| 6,581,040 | B1 * | 6/2003 | Wright et al. | 705/8 |
| 6,647,373 | B1 * | 11/2003 | Carlton-Foss | 705/37 |
| 2001/0044768 | A1 * | 11/2001 | Wares | 705/37 |

OTHER PUBLICATIONS

Michael J Cook, Uniform proposals form for the subcontractor, AACE International Transactions. Morgantown: 1998. p. ES14 pages).*

* cited by examiner

*Primary Examiner*—Jagdish N Patel
(74) *Attorney, Agent, or Firm*—Bernhard Kreten; Audrey Millemann; Weintraub Genshlea Chediak

(57) ABSTRACT

Utilizing the present invention, a buyer for products, services or both would prepare a bid package. The bid package would contain information necessary to complete the project the buyer would desire. At the buyer's option, the bid package is parceled into modules. The modules are prepared as discrete and stand-alone biddable items. A search for suppliers for each module is made from multiple sources based on the modules and directed by the buyer's specifications for the product or service. The system of the present invention packages, processes, connects, procures, bids and reports the competitive bidding cycle for buyers and makes the necessary connection with interested prequalified sellers in a given industry or market. The system receives, compiles, processes and reports the results. The system of the present invention includes a consortium of horizontal and vertical portals, gateways and universal resource locations that encompass trade, industry and market communities.

3 Claims, 7 Drawing Sheets

US 7,430,523 B1

AUTOMATED COMPETITIVE BIDDING SYSTEM AND PROCESS

FIELD OF THE INVENTION

The following invention relates generally to a request for quote (RPQ) system on which buyers post projects open for bid.

Particularly the invention relates to a system that permits buyers of products and services to make requests for bids as well as well as receipt of competitive bids.

In particular, the invention relates to a fully automated outsourced intermediary system that manages the competitive bidding cycle in markets worldwide. Specifically, the invention relates to a system that packages, processes, procures, bids and reports the competitive bidding cycle for buyers and makes the necessary connection with interested prequalified suppliers in a given market sector or industry.

BACKGROUND OF THE INVENTION

Transactions within the competitive bidding process usually involve a buyer going to known suppliers, typically having prior course of dealings with the buyer, for the benefit of an entity for whom the buyer is providing a service. A buyer prepares a bid package from the information supplied by the entity. The buyer then distributes the bid package to suppliers that it is well aware of with requests for bids, quotes or prices regarding contents of the bid package. These known suppliers that received the bid package, review the contents of the bid package and each supplier formulates a bid, quote or price for completion of the bid package. The bids are received by the buyer, processed and the lowest bid from these known suppliers is awarded the contract. While this system has a component of competitiveness and thusly should yield the best bid for the bid package, this conclusion is based on a false premise that the only suppliers that could carry out the contents of the bid package are the ones that the buyer knows of or has reason to know of. However, it is unlikely that a buyer could know every supplier that could carry out the bid package. Thus, it is not necessarily true that the best bid (i.e., from the best qualified suppliers) for the project that the buyer wishes completed has been received. Therefore, there is a need to provide a buyer with information to supplement the buyer's preselected list of known suppliers that would competitively bid on the buyer's project. The instant invention provides such supplemental information. A buyer who is ready to release a bid package to its known list of suppliers would sequester a preselected list of suppliers that it knows. At the same time, the buyer would utilize the instant invention's exchange to review and select additional suppliers. Thus, the buyer would have two pools of suppliers to generate competitive bids therefrom. The first pool is the buyer's preselected list, while the second pool is the listed from the instant invention's exchange (note that suppliers could overlap pools). Thus, the bid package is prepared by the buyer and released to all suppliers in both pools in order to provide an enhanced competitive bidding with respect to the bid package.

Competitive bidding is required by law for the buying and selling of goods for a large portion of the public sector marketplace. Competitive bidding is also desirable in the private marketplace and is an efficient method of using capital to by goods and services.

As practiced today, the state of the art, requires the manual methods of packaging, bidding and processing for the buying and selling of goods and services. These methods have problems associated therewith. These problems include slowness, inefficiency, and being confined or restrained to a local area. The effect of the present invention is to increase the number of qualified bidders. Heretofore, prior system were necessarily constrained geographically. The state of the art, as practiced today, requires the seller to also proceed through the laborious process of finding and following through with sales leads having low chances of success in either the public or private sector. The instant invention permits sellers to maintain a specialization in a particular area of supply goods and/or services because sellers can reduce overhead by getting more leads with minimal salesforce intervention. The instant invention provides a seller with a larger geographical area to bid from and because of this larger geographical area, this allows seller to focus on their niche area of supply for goods and/or services. The instant invention provides a mutuality of benefit for both a buyer and a seller per transaction: the seller obtains a decrease in the cost for obtaining a RFQ, which in turn reduces the seller's overhead, which in turn reduces the price for an item, which in turn allows a seller to be within the buyer's project forecast; while the buyer is able to stay with budget for a project and possibly complete a project under the budget.

The state of the art has reached a chasm in which buyers are unable to find qualified sellers and sellers are unable to find appropriate markets. Although the work or job reaches completion, it is at the cost of the buyers paying a premium and the sellers often losing a sale for their inability to sell within the buyer's projected budgets.

The following reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

"Priceline.com" focuses on the small consumer market buyers searching for a seller. Its style of business is a demand collection system that enables consumers to use the Internet to save money on products and services while enabling sellers to generate incremental revenue. Incremental revenue means a seller making money with volume of purchases instead of individual retail sale purchases. In order to work, PRICELINE must collect individual consumer offers whereby the consumer's offer is guaranteed (by a credit card) for a particular product or service at a price set by the consumer and communicates that demand directly to participating sellers or to their private databases. Consumers agree to hold their offers open for a specified period of time to enable PRICELINE to fulfill their offers from inventory provided by participating sellers. Once fulfilled, offers generally cannot be canceled. By requiring consumers to be flexible with respect to brands, sellers and/or product features, PRICELINE enables sellers to generate incremental revenue without disrupting their existing distribution channels or retail pricing structures. Thus, for the sale of goods the purchase price is very close to the actual cost per unit price. The buyer is unsure of what the outcome will be, i.e. will he or she get the airline seat or will someone else get it because of a higher bid or quicker time of response for that seat. The present invention, in contrast, is directed to sophisticated buyers and sellers that are registered users of the present invention. The present invention is a generalized request for quote system on which buyers post projects open for bid as well as their prequalification requirements of sellers. Qualified registered sellers are notified directly by the system. Sellers from their accounts may purchase bid packages and place a bid on a posted job.

Jobs are accumulated and returned to the buyer upon the closure date. Further the present invention provides to its registered users resources related to the contract bid process. Such resources include trade community discussions on code issues, finance, taxes, import/export, news and employment opportunities. To allow access to the system of the present invention, there is a registration process that must be undertaken by both buyers and sellers. The registration process provides security to buyers because it verifies whether particular sellers are bondable or have mercantile warranties. The buyers and sellers and their respective transactions fall within the areas of business-to-business, business-to-consumer and business-to-government.

"eBay.com" is one of the many auction sites available on the Internet. These auction sites are designed to attract buyers for a given item that is being sold. These auction sites are opposite of what the present invention constitutes. With the present invention buyers define the product or service they wish to purchase. Sellers propose bids to provide the product or complete the service requested if they are deemed qualified by the buyer.

The following are other "e-commerce" businesses that reflect the state of the art that the applicant is aware of.

"Bidfocus.com" collects data through the use of a search engine on the World Wide Web, comb through professional journals and also from the web sites of existing clients, and presents the data gathered to suppliers and vendors who are looking for business.

General Electric's Trading Partnership is a network to competitively purchase goods internally, as in an intranet.

McDonnell Douglas—Boeing Internal Buying Network is utilized to purchase supply parts competitively for the corporation's internal use.

"PrimeContract.com" provides owners of construction projects and construction companies with a competitive advantage by harnessing the power of the Internet to electronically automate the entire sourcing, bidding and procurement processes for commercial construction projects around the world. "PrimeContract.com" controls, audits and analyzes the procurement of services and materials needed by the Architect, Engineering and Contracting (AEC) industry (a.k.a. the A/E Community). By using PrimeContract.com to source materials, services, equipment, share projects plans, and then bid, procure, and purchase in an online marketplace in order to facilitate a faster, on-time project delivery and reduce project costs. "PrimeContract.com" helps construction companies manage their complex supply chains with uniform processes, while enabling the project owner to make trade-off decisions about construction costs versus lifetime operational costs "Epylon.com" is a website designed to unite education and government buyers together with private and corporate suppliers to facilitate commerce, enhance efficiency and reduce costs. The website provides comparisons of products and services and makes the process of purchasing more efficient; broadens the supplier base and enables quotes and bids to be sent and received electronically. The website adheres to the education and government sector's important purchasing practices, compliance with legal regulations, generates detailed reports for auditing purposes and supports customer-specific pricing that reflects current contract pricing. Ancillary services offer education and government business officials the unique opportunity to create an online community and forum for sharing best practices and other valuable information. For suppliers, the website offers access to a large, national aggregated base of education and government buyers that spend more than $850 billion annually on a wide array of products and services. The website notifies suppliers, via e-mail, of requests for quotes (RFQ)s and invitations to bid from qualified buyers, increasing quote and bid opportunities and leading to additional sales with education and government institutions. The website reduces a supplier's overhead in sales and process costs by automating the processing of routine orders for buyers, freeing a supplier's sales force to focus on servicing existing customers generating new business. The website also reduces a supplier's overhead by enabling suppliers to send order confirmations, bids and RFQs electronically and by migrating customer service online. The website reduces a supplier's customer acquisition costs by enabling business to be conducted electronically through a customized e-commerce network. Suppliers' products and information are published electronically to a global buying community leading to increased revenue growth for suppliers and a shorter sales process. The website permits suppliers to leverage traditionally sales and marketing efforts by acting as an extension of a supplier's existing sales and marketing efforts through offering the opportunity of suppliers to cross-sell, announce new products and run targeted promotions to a large buying community.

"Cometotrade.com" is a website where members post requests to buy or sell and the webmaster will search internationally for companies to supply or purchase the posted products. Buyers and sellers can meet, chat, bid, offer and negotiate online. Members have the option to be notified when a new posting of interest is submitted. The website offers a value-added service to assist clients with the financial, transactional and logistical necessities of international trade.

U.S. Pat. No. 5,243,515, issued on Sep. 7, 1993, to Lee discloses an electronic bidding system that only receives a verbal, telephoned or faxed, bid from a potential subcontractor to a general contractor. It holds this information and electronically delivers it on a preset date to the general contractor and the reporting of amounts other subcontractors had bid to each of the subcontractors participating in the competitive subbidding process.

Below are other patents and electronic documents that reflect the state of the art that the applicant is aware of.

| U.S. Pat. No. | ISSUE DATE | INVENTOR |
|---|---|---|
| 5,794,207 | Aug. 11, 1998 | Walker et al. |
| 6,014,644 | Jan. 11, 2000 | Erickson |
| 6,041,308 | Mar. 21, 2000 | Walker et al. |

ELECTRONIC DOCUMENTS www.purchasepro.com
www.bizbuyer.com
www.ariba.com
www.commerceone.com The other prior art listed above but not specifically described teach other devices for what has become known as "e-commerce" and further catalogs the prior art of which the applicant is aware. These references diverge even more starkly from the references specifically distinguished above.

SUMMARY OF THE INVENTION

Utilizing the present invention, a buyer for products, services or both would prepare a bid package for distribution to potential sellers. The bid package would contain information necessary to complete the project the buyer would desire. The bid package is parceled into modules. The modules are prepared as discrete and stand-alone biddable items. The buyer then searches "the exchange" (i.e. an integral compendium) to retrieve a list of suppliers for each module. The search is made from multiple sources based on the modules and directed by the buyer's specifications for the product or service.

The system of the present invention packages, processes, calls, procures, bids and reports the competitive bidding cycle for buyers and makes the necessary connection with interested prequalified sellers in a given industry or market. It then facilitates the seller to respond to the buyers needed product or services as well as his qualifications for buyer's review and approval. The system of the present invention includes a consortium of horizontal and vertical portals, gateways and universal resource locations (URL)s, e.g. "web sites", that encompass virtually all trade, industry and market communities.

The system permits ease of use for buyers and suppliers. A buyer or supplier of products or services simply registers with the system by providing information on their organization. After a buyer or supplier provides this information, the buyer or supplier would be issued a unique identification number. The identification number permits buyers and sellers to utilize the system's unique features. The system automatically makes the appropriate connections based on product or job specification provided by buyers. When data from specified sellers match that of a buyer, the system's automated response component is engaged to bring the buyer and suppliers together.

The system of the present invention provides resources to assist buyers and sellers in completing the transaction of products and services. For example, the system can provide appropriate industry information on foreign trade guidelines. Also, as an example of the many resources provided by the system, there is provided a "community" section where individuals can exchange thoughts and information with others in a specific industry.

With respect to the state of the art outlined above, the present invention is different in that, inter alia:

The present invention is a very encompassing and elaborate system to request for a bid as well as receive a qualified, competitive bid. As examples:

A buyer can use the present invention's system to announce globally that the buyer needs to buy and is seeking competitive prices for the product or service that the buyer wishes to purchase.

A buyer can prequalify a seller to the buyer's specific desires, for example, by region, background, experience, types of licenses held, references, etc.

A buyer can sequester and divide the buyer's purchasing needs such that the buyer can buy certain items directly from specific buyers and yet request other items through a tiered supply chain. The buyer can then receive a compilation of the full bid package reported in multiple ways.

A buyer can reach multiple vertical markets to a distributor or a manufacturer directly.

A buyer can receive bids for additional or fewer multiple components called "additive alternatives" and "deductive alternatives" respectively to the base bid. This allows the buyer to tailor the purchasing budget to the bid prices of the components that could be deferred.

A buyer can reach sellers directly via electronic messages directly to sellers (open or prequalified) to request a bid.

A buyer has the capability to send addendums to the recipient of the original bid request.

A buyer has documented receipt of the date and time when each bidder received the package and/or addendums and as each supplier (bidder) sends back their respective bid.

A buyer has the capability of sending a bid package both directly in an electronic format and a hard copy format through a printer's shop.

Buyers and sellers pay for different services at different steps and can use only those needed.

Payments are secured transactions and encrypted to the system's financial institution. The financial institution has the capability to notify the other parts of the system when payment is received and verified that funds are available.

The system of the present invention has multiple ways of stopping a transaction until payment is received and verified.

The system of the present invention has multiple firewalls where security measures are in place to maintain the confidentiality of the whole buying and selling process.

The system of the present invention can obscure from view submitted information from all parties until a particular closing date and time for receipt of bids. At that given moment, the buyer and seller have access to limited reports on an "as needed" basis. The system can generate multiple bid reports to view different data to different parties.

The system of the present invention facilitates the ability of sellers to reach buyers globally. Sellers can be selective in their search for buyers.

The system of the present invention allows sellers to be readily in contact with the buyers so as to receive additional information or addendums to a given bid package.

The system of the present invention allows sellers to select only specific services for a specific price.

The system of the present invention allows the display of advertisements.

The system of the present invention has the capability of searching, comparing and selecting the bid for the desired product or service, qualified by the buyers and sellers specification, attributes and price.

The system of the present invention has the capability of presenting information in multiple languages.

In sum, the system of the present invention is capable of serving, at any step, any number of: tiers (n tiers); modules (n modules); suppliers (n suppliers); qualifying criteria (n qualifying criteria); in any country in the world (n countries) and any translatable language (n languages).

OBJECTS OF THE INVENTION

It is an object of the present invention to provide an automated process to competitively bid out projects, products and services in areas of commerce such as the public and private sectors serving business to business, business to government and business to consumers.

It is further an object of the present invention to assist buyers to bid smarter and more efficiently while exponentially increasing the demand for suppliers' products and services.

It is further an object of the present invention to provide a competitive bidding cycle that is the most efficient money saving method of using capital to buy products and services offered to the public and private sectors.

It is further an object of the present invention to provide an automated competitive bidding service that caters to the business-to-business, business-to-government and business-to-consumer market sectors.

It is further an object of the present invention to provide bidding and procurement services in both horizontal and vertical markets segments, some of which include: electrical, telecommunications, medical, high-technology, steel, power generation, infrastructure and transportation.

It is further an object of the present invention to provide an automated competitive bidding service and procurement strategies to buyers and suppliers that utilize the wide area networks of computers and telecommunication that permeate the industrialized nations of today and tomorrow.

It is a further object of the present invention to serve the sellers (suppliers, vendors, manufacturers, distributors, etc.) by directly alerting them with targeted leads for their respective products and services.

It is a further object of the present invention to provide ancillary services of assisting buyers in packaging and disseminating bid information in a timely manner.

It is a further object of the present invention to provide ancillary services of tracking, documenting and reporting data form sellers to buyers during the bidding phase.

It is a further object of the present invention to provide buyers with the option of prequalifying the potential bidders (sellers).

It is a further object of the present invention to allow buyers to selectively sequester bidding of products and services within a larger overall bid.

It is a further object of the present invention to provide a capability to choose the form of a "private" bid where the bid opportunity is available to only a pool of selected bidders without opening up to the entire spectrum of available and qualified bidders.

It is a further object of the present invention to offer "sealed bids" in a e-commerce competitive environment.

It is a further object of the present invention to provide a large number of related but free-standing horizontal and vertical market gateways all of which facilitate attracting targeted buyers and sellers in the marketplace.

It is a further object of the present invention to attract a very large cross-section of e-commerce that involves buying and selling on a competitive basis.

It is a further object of the present invention to provide buyers and sellers with global services transcending multiple cultures through multiple languages; sensitive to differences in cultural backgrounds for content and advertisements.

It is a further object of the present invention to provide buyers the ability to restrict the sellers within the their own global region or "open up" to a selected region.

It is a further object of the present invention to provide a reduction in the bid price by providing a buyer with the ability to selectively seek out qualified bidders in a larger marketplace.

It is a further object of the present invention to provide the seller with the ability to offer a competitive price when a chance to exponentially increase their volume of sales.

These and other objects will be made manifest when considering the following detailed specification when taken in conjunction with the appended drawing figures.

DESCRIPTION OF PREFERRED EMBODIMENTS

Figure 1A:
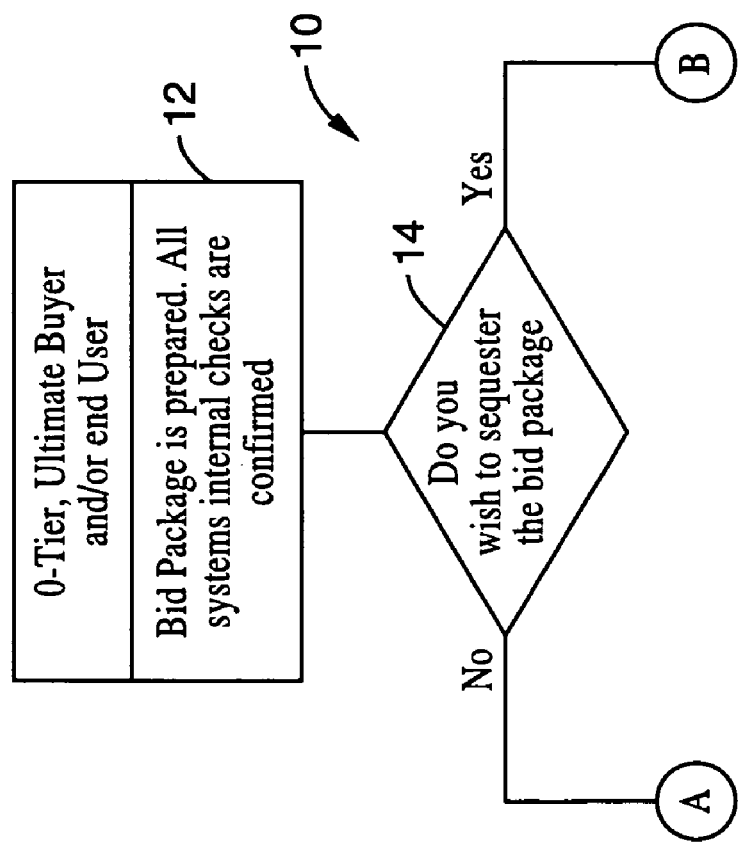
FIGS. 1A, 1B and 1C shows an overview of a preferred embodiment of the system of the present invention.

The following explanation of terms will assist those skilled in the art in understanding the present invention.

The terms "supplier" and "seller" and their derivatives are interchangeable.

Tier—A tier is a hierarchical numerical level (0, 1, 2, 3, etc.) in the process of buying and selling. The lowest number represents that entity that originates the process, usually it is the buyer. The buyer could be the end user or could be a supplier for another supplier or the end user. Higher numbered tiers indicate subsequent levels in the hierarchical chain removed from the central core (for instance the end user) but needed to fulfill the upper (lower numbered) tier. At a given tier a seller can become a buyer for the tier further removed.

Below are illustrative examples of the use of tiers in the competitive bidding process and should not be taken or construed to limit the scope of the invention to one particular industry, but instead should be construed as facilitating the basic constructs of the instant invention which are limited only by the dictates of the claims hereinbelow.

0 Tier (tier 0)—The entity that is the ultimate beneficiary, ultimate buyer, end user or user. It is generally a buyer. For example, in the construction industry it could be a home or building owner.

$1^{st}$ Tier (tier 1)—The entity that is the first level supplier to the 0 Tier. The $1^{st}$ Tier generally looks at the big picture to supply all (turnkey) to the 0 Tier. For example, in the construction industry, if the 0 Tier is a home or building owner, then the $1^{st}$ Tier is a home builder corporation or a program or construction manager (CM) to the construction of a building. A $1^{st}$ Tier entity will solicit from the next tier to meet its needs and will become a "buyer" to the $2^{nd}$ Tier; while being a supplier to the 0 Tier. The $1^{st}$ Tier entity can have multiple $2^{nd}$ Tier suppliers.

$2^{nd}$ Tier (tier 2)—This entity is the second level of suppliers. This entity will supply to the $1^{st}$ Tier above. In this role this entity is a seller to the $1^{st}$ Tier. To meet its needs, the $2^{nd}$ Tier entity will become a buyer for the $3^{rd}$ Tier below. The $2^{nd}$ Tier entity can have multiple $3^{rd}$ Tier suppliers. To expand upon the previous example, a $2^{nd}$ Tier entity is a general contractor. Also, the $2^{nd}$ Tier entity is a $2^{nd}$ Tier supplier either directly to the 0 Tier home owner or via the $1^{st}$ Tier (Home Builder or Construction Manager).

$3^{rd}$ Tier (tier 3)—This entity is the third level supplier. This entity is a supplier to the $2^{nd}$ Tier, who will then supply the $1^{st}$ Tier, who will supply to the ultimate end user 0 Tier. This entity will also be a buyer to the $4^{th}$ Tier. Each $3^{rd}$ Tier buyer can have multiple $4^{th}$ Tier sellers. To continue with the example already started, an example of a $3^{rd}$ Tier buyer would be subcontractors specializing is particular facets of building construction: plumbing, electrical, road, etc. These entities are sellers to the Tier above, but buyers for the $4^{th}$ Tier below them.

$4^{th}$ Tier (tier 4)—This entity is the fourth level supplier. These entities supply to the third tier above, who will supply the chain upward. However, this entity is also a buyer for the $5^{th}$ Tier below. At such a far removed Tier, these $4^{th}$ Tier suppliers usually are "stand-alone" suppliers that serve many horizontal markets (buyers). For example, toilet fixture suppliers, lighting suppliers, rock and gravel suppliers. As an example of a horizontal market, a rock and gravel supplier might supply rock and gravel to a subcontractor that specializes in road construction or a subcontractor that uses the rock and gravel as a base to laying to a building foundation. Or, a rock and gravel supplier might supply rock and gravel to a concrete plant as a part of their concrete mix. Another example is in the supply of medical equipment upgrades. A medical supply house might supply the latest medical treatment and diagnostic equipment to a contractor that specializes in the installation of this equipment in newly constructed medical facilities. Also, the medical supply house might sell similar equipment to local, state or federal governments; or even sell to foreign governments or international charities for aid to people in crisis. Or, the medical supply house might sell similar equipment to doctors' practices in order for the doctors within the practice to keep update with the latest medical technologies.

$5^{th}$ Tier (tier 5)—This entity is a fifth level supplier. This entity is a supplier to the $4^{th}$ Tier above. This level of supplier is a specialty supplier or often they are the manufacturers. Also they can be "stand-alone" suppliers with niche markets in the horizontal markets. They usually have large geographic regions to supply. Examples include: antique light fixture chandelier manufacturer, marble tub manufacturer, etc.

All Tiers are generally needed to completely satisfy the 0 Tier. It is possible that some far removed tiers can be temporarily deferred and/or partially "satisfied" (i.e. contacted directly) by the 0 Tier. Eventually all tiers will be needed.

Module—An element of discrete, stand alone product or service that can be fragmented away from within the remaining bid package. For example: equipment purchased and delivered from a unique source or a specialized trade like landscaping.

Bid—The term includes not only a bid, but also a "quote" or "price". The word "quote" or "price" connotes less complexity for the provision of goods and services than the term "bid".

The system is capable of serving, at any step, any number of Tiers (n Tiers), any number of modules (n modules), any number of suppliers (n suppliers), any number of qualifying criteria (n qualifying criteria), in any country in the world (n countries) and any translatable language (n language).

Considering the drawings, wherein like reference numerals denote like parts throughout the various drawing figures, reference numeral 10 is directed to the preferred embodiment of the system according to the present invention.

Figure 1B:
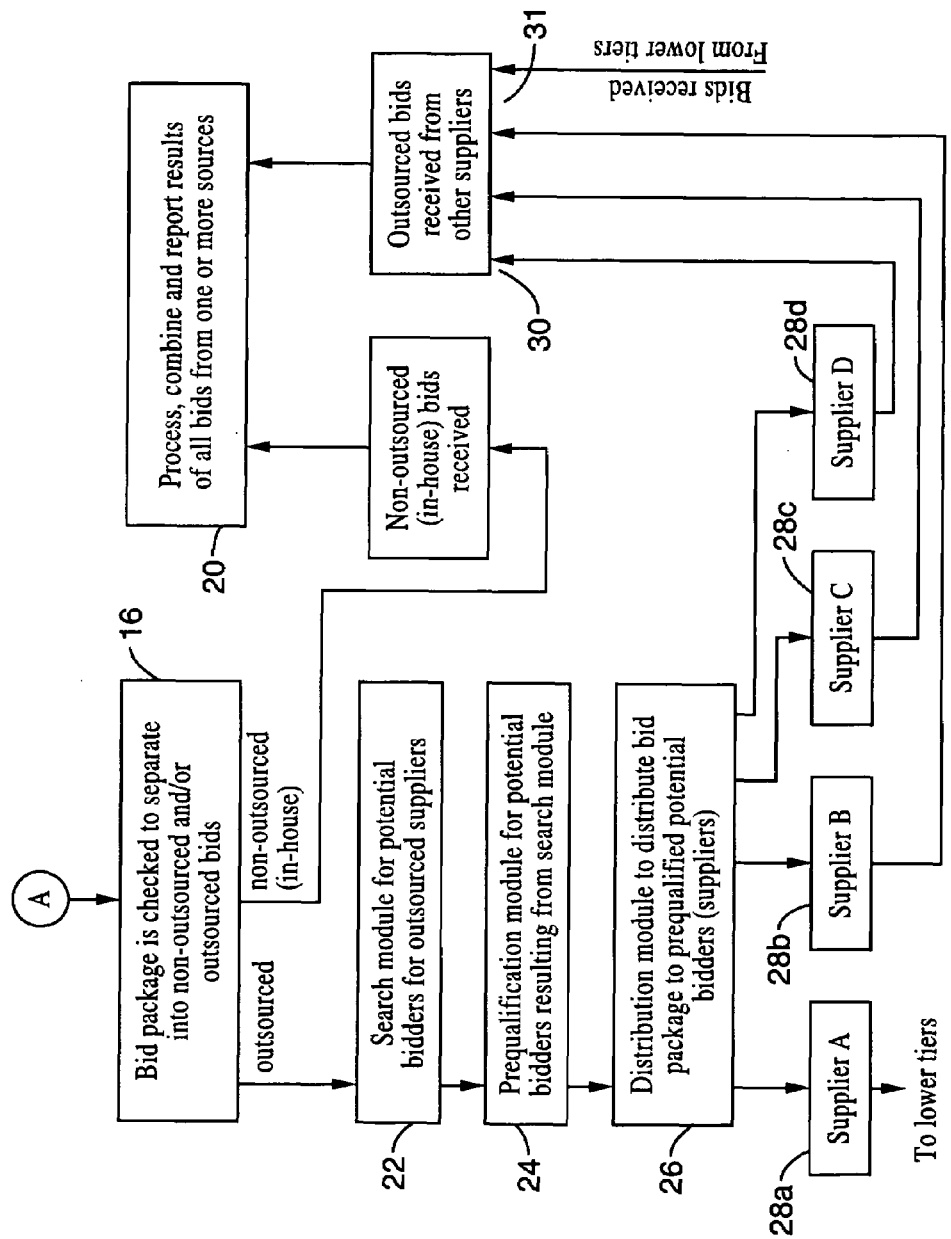
Figure 1C:
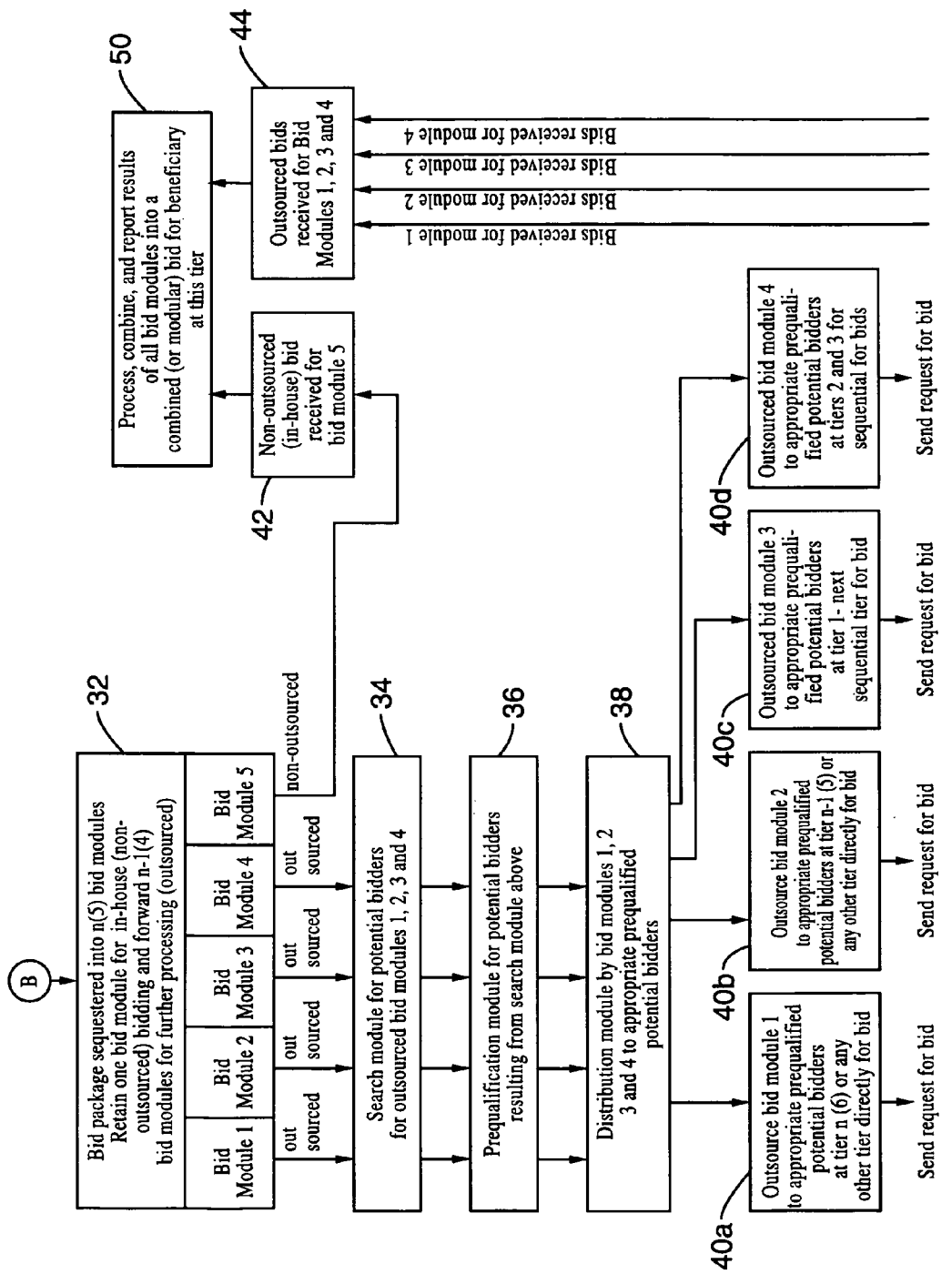

FIGS. 1A, 1B and 1C show an illustrative overview of a preferred embodiment of the system of the invention.

Starting with FIG. 1A, a preferred embodiment of the present invention has the preparation step 12 of what is known in the art as a "bid package." A bid package is information conveying what a buyer or end user desires as a product or service. Within the bid package preparation step, the present invention initiates the system's internal checks and these checks are confirmed by the system. The system checks to assure that the buyer (or seller) is a registered entity with all payments in place for its own membership and for the services that it is requesting. The system checks to confirm that it can provide these services in the geographic region of the world. It confirms the languages (other than English) needed are available. It confirms the appropriate information necessary to "take a bid out to the marketplace," e.g., opening and closing dates of bid, provision for addendums, etc. It sets up the privacy levels and security access for the buyers and sellers; e.g., buyers can access more information than sellers. The preferred embodiment progresses to the decision step 14 of whether or not there is a necessity to sequester the bid package into modules. If the bid package is not sequestered, then the process is to decide whether the bid package is to be outsourced or non-outsourced for bids, step 16.

If the bid package is non-outsourced, then the bid that will be received by the system will be a non-outsourced or in-house bid for the product or service, step 18, and this bid will be the bid for the bid package that is processed and reported, step 20. If the bid package is to be outsourced, then a search is conducted for potential bidders that are going to be outsourced suppliers, step 22. The search for suppliers is achieved by a number of channels. The first channel is for the ultimate buyer, end user or user of the system of the present invention to select a number of known (and qualified) suppliers, i.e. suppliers that the buyer has personal knowledge of and thusly a supplier that the buyer has typically had previous course of dealings. The implication to the present invention is there is no need for prequalification of this type of supplier to a particular buyer. A second channel defines an exchange to review and select a number of suppliers. A third channel is for the user to utilize the present invention's ability to permit matching products or services with suppliers thereof via categories of businesses, NAICS or SIC codes and/or key word matching from descriptions that were given by suppliers when the suppliers registered with the system of the present invention. A fourth channel is suppliers that are found by announcements sent to and received from related product or service suppliers. Therefore, a buyer or user of the present invention's system may utilize as many as four channels to gather a list of suppliers for the products or services that the buyer or user wishes to solicit, using the bid package.

The prequalification process, step 24, culls the supplier list. Within the prequalification process each supplier within the list is given a statistical weight based on a number of factors. The factors included, but are not limited to, the type of license held by the supplier; amount of insurance and/or indemnification; amount of bonding capacity; financial condition; creditworthiness; length of years in business; number of in-house employees; number of subcontract staff; outstanding lawsuits; reference contracts; distance of operation base to a worksite; service personnel; maintenance shops; and additional criteria that are within the scope and spirit of any industry that the system of the present invention is being utilized as a means to achieve a responsible and qualified bid for given bid package. Also, responses to the above can both be displayed as submitted or processed as a weighted score and reported separately. The result from the prequalification process is a listing of screened and prequalified potential bidders that could become the suppliers for the contents of the bid package.

The next step, step 26, is the distribution of the bid package to the prequalified potential bidders (suppliers) for the contents within the bid package. The distribution may be carried out electronically, e.g. e-mail, and/or through a printer that has the capability of making multiple renditions of the bid package. Upon completion of distribution, copies of the bid package will be within the confines of each prequalified potential bidder (supplier) in order to make a bid on the contents within the bid package.

At the next step of the process, step 28a-28d, the bid package has been received by multiple suppliers and is being processed to formulate a bid and to return the bid to the sequential tier by a given date and time. The use of four suppliers A-D within FIG. 1B should not be construed as limiting the scope of the invention, but rather as an illustration to aid those skilled in the art to understand the invention. Again, the system of the present invention is capable of serving, at any step, any number of: tiers (n tiers); modules (n modules); suppliers (n suppliers); qualifying criteria (n qualifying criteria); in any country (n countries) and any translatable language (n languages). Within this illustrative example, suppliers B, C and D decide to make respective bids on the bid package without the need nor desire to outsource any part of the bid package. Their respective bids are received, gathered and processed, step 30, and combined, step 20, with any other bids from any other bid sources; e.g. through an in-house bid, step 18, to process and report the results of all bids from one or more sources.

Seasonally, supplier A has decided to outsource at least part of the bid package to its tier or tiers of suppliers. Thus, begins the iterative process where the supplier for the tier above becomes the buyer for the Tier below of the product or service within the system of the present invention. This supplier A basically proceeds through an analogous process that the previous buyer utilized with the system of the present invention. The supplier is now a buyer and utilizes an analogous process of deciding whether or not a search for potential suppliers is warranted; if so, then proceeds with a search following the four channels outlined supra. Upon the attainment of a listing, this supplier subjects the listing to the prequalification process. After the listing has been culled to a list of prequalified potential suppliers, the next step is distributing the bid package to the prequalified potential suppliers which now have become prequalified potential bidders (for example, suppliers A'-D' not shown). Each supplier would receive and process the bid package and formulate and return a bid as noted by 31.

The bid each supplier made would then be received and processed by the system and then all bids whether outsourced or non-outsourced would be combined and reported as results from one or more sources which would lead to the ultimate user or buyer able to choose one bid that met the criteria of the bid package. The result of the choice leads to a formation of contract between the buyer(s) and supplier(s).

It is likely this process leads to an increase in savings to the buyer(s) because of the increase in competitive bids due first to the variety of potential bidding sources provided by the system and second the ability of a buyer to go directly to the source of products or services. This avoids the incremental mark-ups associated in going through the normal chain of buyer and supplier of goods and services, e.g. the manufacturer-to-distributor-to-wholesaler-to-retail-to-buyer chain. In other words, there is an elimination of middleman "mark-up"—pass through without added value. The suppliers also benefit because of the increase in exposure they receive by being registered with the system of the present invention. It also allows suppliers to remain specialized and efficient.

Back to viewing FIG. 1A, if the entity at the 0 Tier decided that the bid package needed to be sequestered into modules, then the procession through the present invention would proceed to the illustrations within FIG. 1C.

In FIG. 1C, the system of the present invention sequesters the bid package into N bid modules. For example and not to be construed as limiting the scope of the invention, N equals 5. In this example the party receiving or preparing the bid package decides to sequester the bid package into a plurality of five bid modules. The sequestration can be done at and by the buyer and/or bid package preparer. Alternatively, the sequestration can be done by a preferred embodiment of the system at the request of a buyer or bid package preparer. In the illustrative example for a preferred embodiment of the present invention, the bid package is fragmentized into five modules, step 32. This illustrative model of a preferred embodiment has modularized the bid package into four outsource bid modules and one in-house or non-outsourced bid module. With respect to the non-outsourced bid module, that module is processed by the party receiving the bid package either as a whole or in modular or fragmentized form and an in-house bid is assigned to that module, step 42. In the instance illustrative case, bid module 5 is assigned an in-house bid. The in-house bid is then, in step 50, received, processed and also stored awaiting the bids for all other modules that are outsourced. In step 34, the system of the present invention utilizes four channels to search for potential bidders for each of the outsourced modules 1-4. The four channels are as follows. A first channel is the buyer's or user's own personal knowledge of suppliers that could potentially bid on the bid package. A second channel is the utilization of an exchange to review and select a number of suppliers. A third channel is for the user to utilize the present invention's ability to permit matching products or services with suppliers thereof via categories of businesses, NAICS or SIC codes and/or key word matching from descriptions that were given by suppliers when the suppliers registered with the system of the present invention. A fourth channel is suppliers that are found by announcements sent and/or received from related products or services. Therefore, a buyer or user of the present invention's system may utilize as many as four channels to gather a list of suppliers for the products or services for each of the modules that the buyer or user wishes to acquire from the bid package.

The prequalification process, step 36, culls the supplier list. Within the prequalification process each supplier within the list is given a statistical weight based on a number of factors that will certify that the criteria for such module (e.g. as to equipment, certification and seller accreditation) has been met. In other words, that module is finished being processed. The factors included, but are not limited to, the type of license held by the supplier; the type of product or service desired to be acquired; years of production of product or performance of service that the supplier has; whether a product has undergone UL or ETL testing and whether it has been rated; amount of product or liability insurance and/or indemnification; amount of bonding capacity; financial condition; creditworthiness; sales volume; product warranty; years in business; number of in-house employees; number of subcontract staff; outstanding lawsuits; reference contacts; distance of operation base to a worksite; service personnel; maintenance shops; location of manufacturing plant or factory or assembly plant; distributor source; ability to meet seismic criteria for location; and additional criteria that are within the scope and spirit of any industry that the system of the present invention is being utilized as a means to achieve a bid for given bid package. Also, responses to the above can both be displayed as submitted or processed as a weighted score and reported separately. The result from the prequalification process is a listing to screened and prequalified potential bidders that could become the suppliers for the contents of the bid package.

The next step, step 38, is the distribution of the bid modules to the prequalified potential bidders (suppliers) for the contents within each bid module. The distribution may be carried out electronically, e.g. e-mail, and/or through a printer that has the capability of making multiple renditions of each bid module. Upon completion of distribution, copies of the bid modules will be within the confines of each prequalified potential bidder (supplier) in order to make a bid on the contents within the bid module.

Some suppliers maybe able only to make bids on one module while other suppliers maybe able to make bids on a set of modules because they have the capacity to handle the workload or are going to outsource certain modules while retaining other modules. The present invention can be utilized iteratively with respect to the suppliers that are bidding on one or more modules. The suppliers become buyers and are able to fragmentize a module each receives into sub-modules thus further fragmentizing and modularizing the bid package into smaller and smaller modules in order to get down to, if necessary, individualize components.

At the next step of the process, step 40a-40d, the bid modules have been received by the suppliers and are being processed to formulate a bid for return to their respective bid to the N−1 tier by a given date and time. The use of four suppliers A-D within FIG. 1B should not be construed as limiting the scope of the invention, but rather as an illustration to aid those skilled in the art to understand the invention. Within this illustrative example, suppliers B, C and D decide to make respective bids on the bid package without the need nor desire to outsource any part of the bid package. Their respective bids are received, gathered and processed, step 44, and combined, step 50, with any other bids from any other bid sources; e.g. through an in-house bid, step 42, to process and report the results of all bids from one or more sources.

Figure 2:
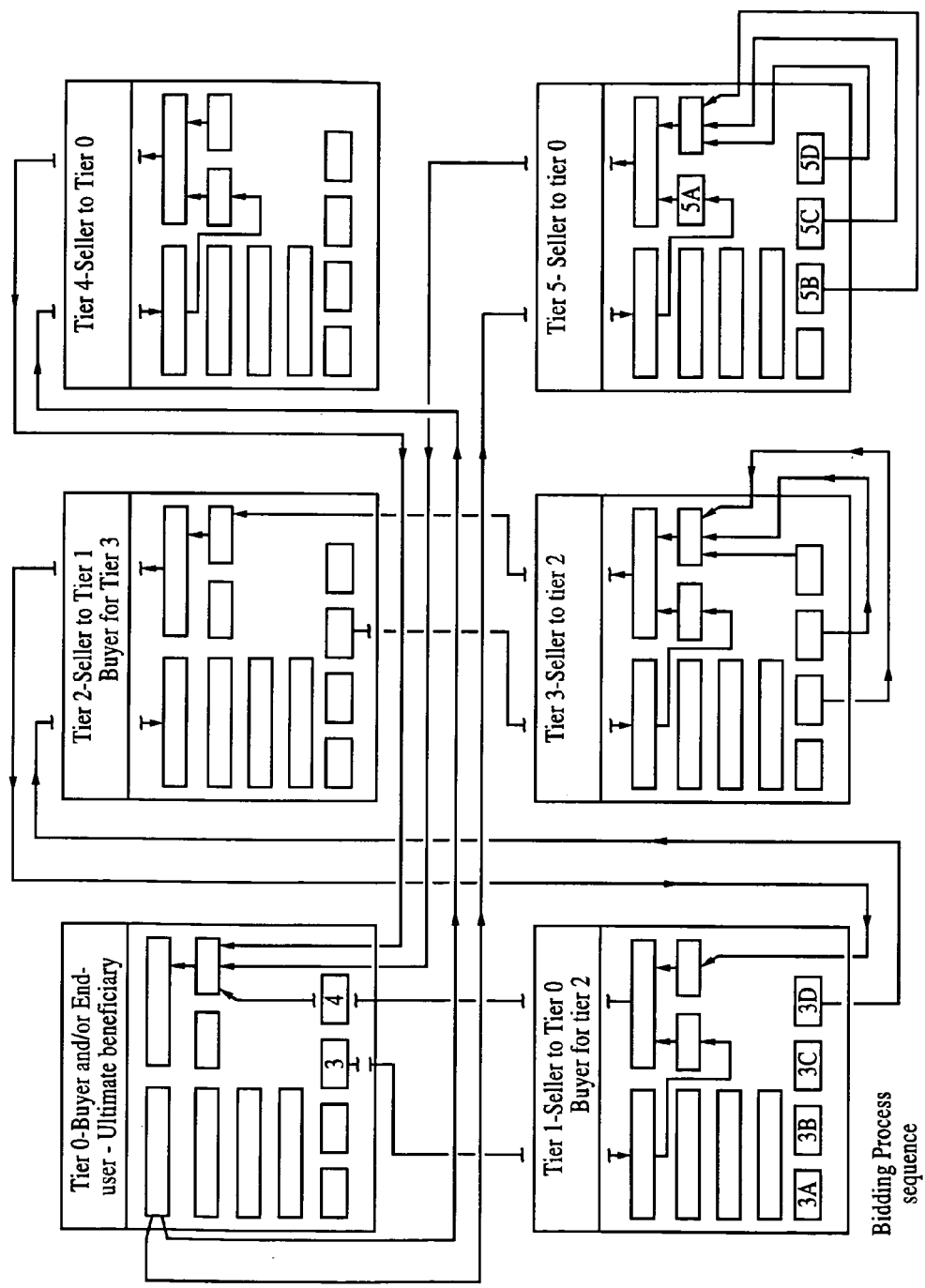
FIG. 2 shows an illustrative example of how the system of the present invention is utilized by a buyer or user for the competitive bidding cycle.

FIG. 2 provides an illustrative example of a preferred embodiment utilizing the precepts of the present invention in order to maximize cost effectiveness by the avoidance of "middlemen's mark-up" with limited or no "added value", had the normal course of business dealing through the normal channels transpired between the ultimate beneficiary of a product or service and the original supplier of the product or service. In this example, tier 0 is the buyer and/or end user (buyer/user) of the system. The particular buyer/user has itself prepared a bid package, in which the system of the present invention facilitates placement of the bid package into the system. Alternatively, the buyer/user can provide information and instructions to the system whereby the system itself prepares a bid package for receipt into the system and if necessary sequesters the bid package into modules. The present invention permits sequestration of the bid package into modules within or without the system of the present invention. In this example the buyer/user decides that the bid package needs to be sequestered into modules, particularly, four modules.

The buyer/user, which is at tier 0, has the system of the present invention outsource the module 1 directly to a known supplier at tier 4 without searching or prequalifying this supplier. Utilization of the system of the present invention in this instance has saved the buyer/user a sum of money because the buyer/user has avoided the aggregated mark up of the product or service had the buyer went through the traditional and/or normal course of business of that particular industry. For example in the building industry, the normal course of business would have been a buyer who wants a building constructed on a particular tract of land contacting a builder or project construction manager ($1^{st}$ tier supplier), who would contact a general contractor ($2^{nd}$ tier supplier) who would contact a subcontractor ($3^{rd}$ tier supplier) who would contact a "stand-alone" supplier ($4^{th}$ tier supplier). As the product or service is delivered up through the tiers each supplier would add on a mark-up to the original price of the product or service received from its supplier. Another example utilizing the system of the present invention to go directly to a supplier tier (e.g. $4^{th}$ tier supplier, "stand-alone" supplier), that actually supplies the product or service would be a home owner wanting a new heating, ventilation and air conditioning (HVAC) system for their new or existing home. The home owner would be considered at the 0 tier buyer/user of the system. The home owner has prepared a bid package comprising a single sheet of paper and enters it into the system or provides the system with information and the system prepares the bid package. In this case, the home owner knows of a distributor ($4^{th}$ tier supplier) of the HVAC equipment that is desired. That distributor receives the bid package or a module thereof containing the information necessary for the distributor to process the information and formulate a bid for the particular equipment needed to fulfill the requirements of the bid package or a module thereof. The distributor's bid ($4^{th}$ tier supplier) is then sent directly to the home owner (0 tier buyer). The home owner has received substantial savings by going through the system of the present invention, because under the normal course of business a home owner desiring a new HVAC unit would have to contact a mechanical contractor that supplies and installs HVAC equipment and that company would contact the HVAC equipment distributor. The distributor would sell the equipment to the company at a wholesale price. In turn, the company would sell the equipment to the home owner at a retail price. By avoiding this traditional and/or normal course of business, the home owner received a benefit of the difference between the wholesale and retail price minus the overhead of utilizing the system of the present invention.

Continuing with the example within FIG. 2, the 0 tier buyer/user instructs the system of the present invention to outsource module 2 directly to a tier 5 supplier. Again, no search, prequalification screening or distribution are needed because the 0 tier buyer/user has gone directly to the supplier that could provide the product or service directly to the buyer/user. In this case, the $5^{th}$ tier supplier decides that what product or service (the outsourced module 2) that the buyer/user has requested a bid upon needs to be further sequestered into modules, e.g. submodules 5A, 5B, 5C and 5D with submodule 5A being able to be done in-house, while submodules 5B, 5C and 5D are outsourced for competitive bids. Upon receipt of competitive bids, all submodules at the $5^{th}$ tier are combined for a single $5^{th}$ tier bid that becomes the module 2 bid and that bid is sent back to tier 0. Thus, the buyer/user at tier 0 has received a bid for module 2 at a savings vis-à-vis without going through the "traditional" competitive bidding process which would entail the buyer going to a supplier and that supplier going to a "stand-alone" supplier and so on.

For module 3, the buyer/user at tier 0 outsources module 3 to the next sequential tier, $1^{st}$ tier suppliers. In this case, the buyer/user of the system utilizes the appropriate searches available, prequalification screening and distribution as outlined supra. The $1^{st}$ tier supplier receives the module 3 and sequesters it into submodules 3A, 3B, 3C and 3D. The $1^{st}$ tier supplier decides to keep submodule(s) for an in-house bid and outsource the reminder submodule(s). For example, module 3D is sent to a $2^{nd}$ tier supplier for further bids after the $1^{st}$ supplier used the appropriate searches, prequalifications and distribution that the system of the present invention has to offer a buyer/user. The process outlined supra repeats for Tier 2 and Tier 3 suppliers respectively; thus, making the $1^{st}$ tier supplier a buyer for suppliers at tier 2, while the supplier at tier 2 becomes a buyer to tier 3. Each tier's supplier processes and bids to the above tier in sequence until a combined bid is received at the $1^{st}$ tier consisting of $1^{st}$ tier supplier's in-house bid and bids from Tier 2 and Tier 3. This bid is then forwarded to tier 0.

At tier 0, the bids for each module (modules A, B, C & D) are received and finally combined from Tier 1 and Tier 4 and Tier 5 for a final bid to tier 0 who is the ultimate beneficiary of the process that the system undertakes to produce the savings to the buyers/users of the system.

The system in capable of processing any number of Tiers (n), sequestering at any Tier into any number (n) of modules. The system then can process the modular and Tiers in any combination. It combines the received bids in whatever stage either out the level that sequestered it, or processes it upstream to the ultimate beneficiary as desired.

The following is an illustrative example utilizing the instant invention.

Automated process for procurement and resource management

This system can function either as a stand alone system or can be inserted (integrated) as an ASP for a firms existing process.

The system consists of:

1. Requisitioning

Buyers are capable of searching multiple industries and multiple sectors. These buyers enter the GRAND CENTRAL EXCHANGE on the world wide web. This web site provides a number of general features that are of interest to the buyer as an individual and as a purchaser.

More specifically the buyer can access a specific industry exchange title example" Recreational Goods.com or Apparel Products.com or Mining-Minerals-Ores.com.

Within the specific site, the buyer can access specific supplies hosted within overall, industry-specific exchange.

Thus the buyer can browse within the buyer's industry and sector and gain information that will be helpful in deciding the buyer's specific needs. The buyer can mark the buyer's favorite suppliers for future reference. Additional methods of search can take the buyer to "linked suppliers" that are not fully represented within the industry exchange or whose web site and/or catalog is not hosted at our industry exchange.

The buyer composes a "requisition" or a "bid package" from the information gleaned.

2. Request for Quotes, Prices or Bids

The buyer enters the system and registers as a qualified buyer. The system checks to assure that the buyer is a bona fide entity with all payments in place for buyer's own membership and for the services that the buyer is requesting.

The system checks to confirm that it can provide the service in the geographic region of the world. It confirms the languages needed (other than English) are available. It confirms that the appropriate information to "take a bid to the marketplace are in place example: open and closing dates of bids, provisions for addendums, provisions for "additive alternative" and "deductive alternatives" etc.

The system sets up the privacy levels and security access for the buyer and the sellers.

The buyer as several choice regarding the member of sellers, search for the sellers, prequalifying the sellers, sequestering the bid package etc.

3. Purchase Order (or Contract) Generation Between Buyer and Seller

Once the buyer has received the bids (quotes or process) and is satisfied that the bid is qualified, responsive and responsible, then the buyer announces the decision to any and/or all bidders.

The buyer then uses the contents of the provisions bid package with or without modifications and combines it with its prepared "front end" documents. The full package is transmitted back and fourth in a secure environment till each party is satisfied and affixes its electronic signature to indicate acceptance.

This final contract and/or purchase order is also printed and transmitted in hardcopy form via the established distribution chain print shop.

4. Payment Processing Between Buyer and Seller

The buyer and seller have access to multiple payment methods. These include but not limited to:

1. Drafts
2. Checks
3. Lines of Credit, Letters of Credit
4. Overseas funds transfer and trust accounts
5. Credit Cards The buyer and seller have the capability through our system to set up a program payment schedule as each module of the goods and/or service is received and acknowledged.

The payment system maintains a system of continuos checks and balances to assure trust. The system is secure with multiple levels of security.

5. Follow up to Delivery Management

The system allows for a delivery schedule that the seller provides to the buyer. The delivery schedule with its terms and conditions, liquidated damages etc. is a separate document that is agreed upon concurrent with the purchase order and/or contract mentioned earlier.

The system manages the schedule and keeps all parties informed of the program of delivery. Concurrently it interfaces with the payment method and program payments schedule agreed upon in the purchase order and/or contract.

The system allows the buyer to hold a percentage of retention of payment at each program milestone.

Final payment is released from the buyer to the seller upon successful delivery of the goods and services and all its associated terms and conditions.

The buyer has the capability of reviewing the entire document as a report on the process of procurement for each item. This management tool is then used to streamline each successive procurement, followed through with final contract closure.

Mechanics to Manage Automated Process for needs assessment and management, Resource Management, procurement and contract management, will be accomplished through architecture (software) developed as frontend and backend.

A Front End Architecture.

A1 Consists of a number of generic web sites that invoke a specific category of buyer, example: Federal Bids.com, City-Bids.com, Procurement Bids.com, etc.

These will be designated as Inner Core horizontal markets of registered domain names:

BiddingHeadquarters.com
BiddingPool.com
BiddingUnlimited.com
CheckBids.com
DistributorsWorldwide.com
eCommerceBids.com
eComparisonShopping.com
eCompetitiveBids.com
eGlobalBids.com
eInternationalBids.com
eOpenBid.com
eOpenBidding.com
ePrivateBids.com
eSealedBid.com
eSealedBids.com
InformalBids.com
LowestResponsibleBid.com
MiscellaneousBids.com
PrivateBids.com
ProcurementBids.com
SealedTender.com
SealedTenders.com
UniversalBidding.com UniversalBids.com
UnusualBids.com A2 Consists of a number of "buyer-specific" web sites that invoke a specific category of buyer.

These will be designated as Outer Core horizontal markets of registered domain names:
AgriculturalBids.com
AgricultureBids.com
AirportsBids.com
City-Bids.com
ConsultantsBids.com
CountyBids.com
DamsBids.com
DODbids.com
eConstructionBids.com
eFederalBids.com
eFinanceBids.com
ElectricalPowerBids.com
EnvironmentBids.com
eProjectBids.com
FedsBid.com
FedsBids.com
FisheriesBids.com
ForestryBids.com
HealthIndustryBids.com
HousingBids.com
IndustryBids.com
InfrastructureBids.com
InstitutionalBids.com
MinesBids.com
Oil-GasBids.com
PipelinesBids.com
PortsBids.com
PrisonBids.com
ReconstructionBids.com
RoadwaysBids.com
RuralDevelopmentBids.com
SchoolsBid.com
State-Bids.com
SupplierBids.com
SuppliersBids.com
TelecommunicationsBids.com
TourismBids.com
TransporationBids.com
UnitedNationsBids.com
UniversityBids.com
UrbanDevelopmentBids.com
WaterSupply-Sanitation.com
WorldBankBids.com A3 Consists of a number of seller specific web sites that invoke a specific category of sellers. Some of these sellers can also be buyers.

These will be designated as Vertical Markets (or exchanges), of registered domain names:
AirConditioning-Equip.com
AirlineTicketBids.com
AirplaneBids.com
Animal-Plants-Flowers.com
ApparelProducts.com
Auto-Bids.com
AutomobileBids.com
Beverage-Products.com
BidMortgageLoans.com
CargoBids.com
ChemProductsExchange.com
CommercialGoods.com
CommercialLoanBids.com
Commoditites-Global.com
Const-Bldgmaterials.com
Cosmetics-Healthcare.com
Crops-Millproducts.com
eBankingBids.com
eEquipmentBids.com
ElectricalEnergyBids.com
Electrical-Equip.com
eMedicalEquipmentBids.com
Enviroment-Pollution.com
ExchangeofExchanges.com
Fire-Protection-Equip.com
Fitnessclub-Equipment.com
FleetBids.com
Food-FoodProducts.com
FreighterBids.com
Global-Patents.com
GrandCentralExchange.com
HardwareBids.com
Healthclub-Equipment.com
Home-Housewares.com
Home-KitchenAppliances.com
HVACAequipmentBids.com
Industrial-Goods.com
InstitutionalExchange.com
KitchenEquipmentBids.com
LonghaulBids.com
LumberBids.com
Med-LabEquipment.com
Metals-Minerals-Ores.com
Millun.com
MultipleExchange.com
OfficeEquip-Computers.com
Paper-PrintProducts.com
Patents-Exchange.com
Petroleum-Global.com
PlumbingFixturesBids.com
RecreationalGoods.com
RubberizedProducts.com
Shubnum.com
Steelbids.com
Sunghum.com
TechnologyEquipment.com
Textile-Products.com
Tires-Tubes.com
Tobacco-Products.com
Toiletries-Healthcare.com
Tools-MachineTools.com
TruckingBids.com
TruckloadsBid.com Within A3 above, is a central web site called the Grand Central Exchange.com.

These exchanges are developed as communities that provide several features such as: general information, import/export rules and regulations, an ability to buy-sell, etc.

An independent web site represents each of the domain names. This is "branded as unique and free standing entity". There is a total of 68 horizontal market web sites. Buyers generally use A1 and A2.

A3 is also made up of independent web sites represented by its respective domain names and is "branded as unique and free standing entity". There is a total of 63 exchanges. Sellers generally use A3.

All web sites can communicate internally in a horizontal and vertical manner. They facilitate multiple transactions concurrently and gather statistical data for additional use.

Buyers meet sellers and sellers meet buyers through multiple channels and yet all transactions are controlled and different levels of payments are charged for different services.

Figure 4:
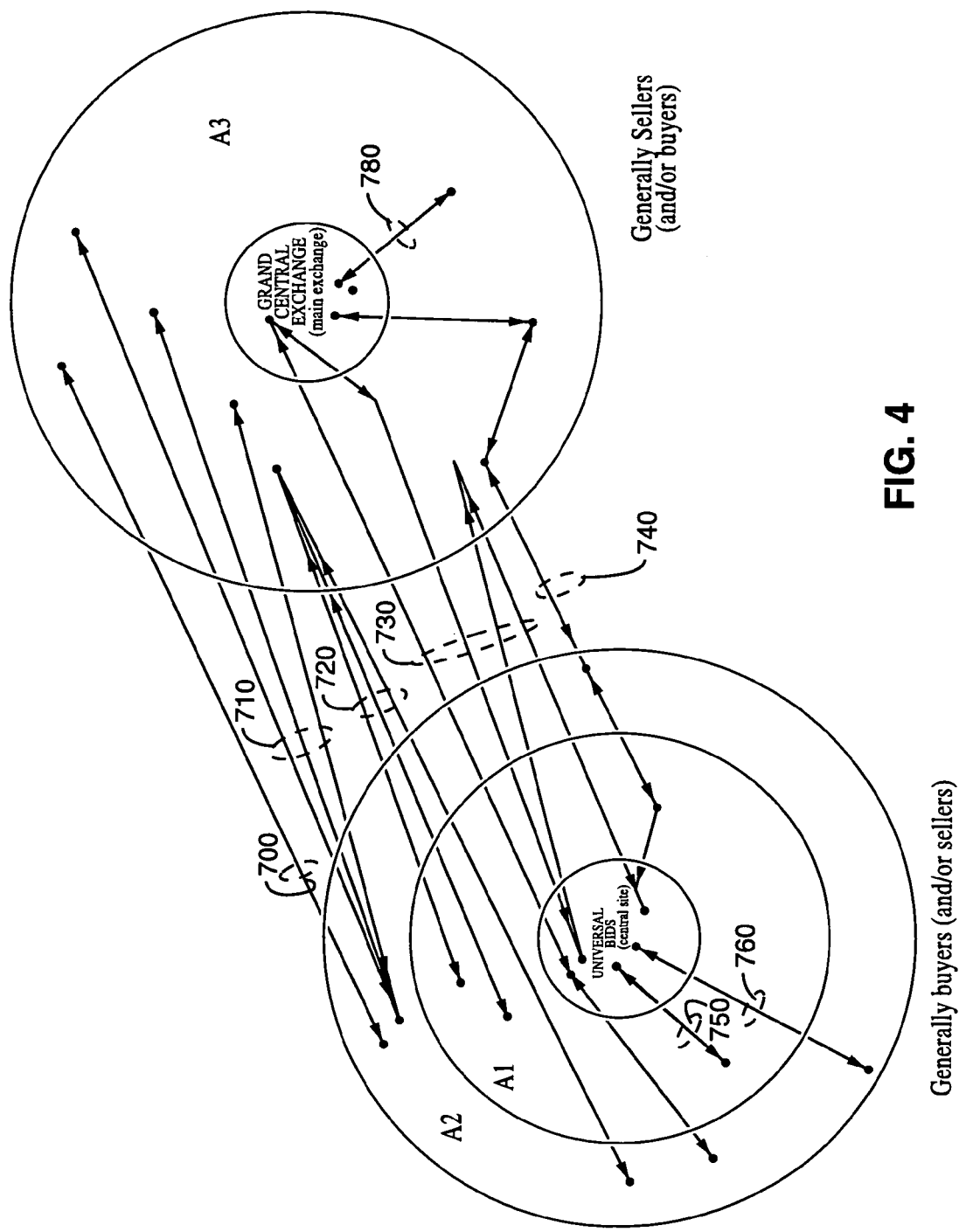
FIG. 4 shows the users' perceptions of the multiple methods of communications and distribution between buyers and sellers.

FIG. 4 shows the users' perceptions when utilizing the present invention. Users are buyers and sellers utilizing the present invention. Within FIG. 4 are multiple methods of communications and distribution between buyers and sellers as they relate to the web sites indicated in A1, A2 and A3. Websites that are in A1 and A2 are generally used by buyers. However, these websites can also be used by sellers. Websites that fall into A3 are generally used by sellers, but can also be used by buyers.

For example, a buyer in an A2 outer core website perceives a direct transaction with a seller at an A3 website as shown by the virtual link 700. Likewise, a buyer in an A2 outer core website perceives a transaction with multiple sellers in A3 websites as shown with virtual links 710. While virtual links 720 show a seller in an A3 website perceives a transaction with multiple buyers in A1 and A2 websites.

Also, within the scope of the present invention a buyer in an A2 website perceives in conducting a multiple tiered transactions with sellers in A3 websites, shown by virtual links 730. Here the sellers become buyers for the next lower tier. Also, one bid package can be sequestered into modules for several different sellers in A3 websites. The transactions can have multiple tiers and multiple modules. Transactions can be routed through the central sites fully or in part. Virtual link 740 shows the perceptions of an ultimate buyer and an ultimate seller conducting a transaction through intermediary buyers and sellers.

A buyer in an A1 website can conduct a transaction with the central site as shown by link 750. Likewise, a buyer in an A2 website can conduct a transaction with the central site shown by link 760. Moreover, a seller in an A3 website conducts a transaction with a main exchange as shown in link 780.

In addition, revenue is generated by a number of ways including, subscriptions, links, referrals, advertisements, percentage of commission of transaction estimate etc.

B. Backend Architecture

The backend architecture is arranged so that the web sites are standardized for content and presentation at a basic level and further modified to serve a specific "flavor" of the industry. Branding is separate and unique for each of the 131 sites.

A common backend software is used with minor modifications since each site is serving the same focused "competitive buy-sell and follow-up" arrangements.

Figure 3:
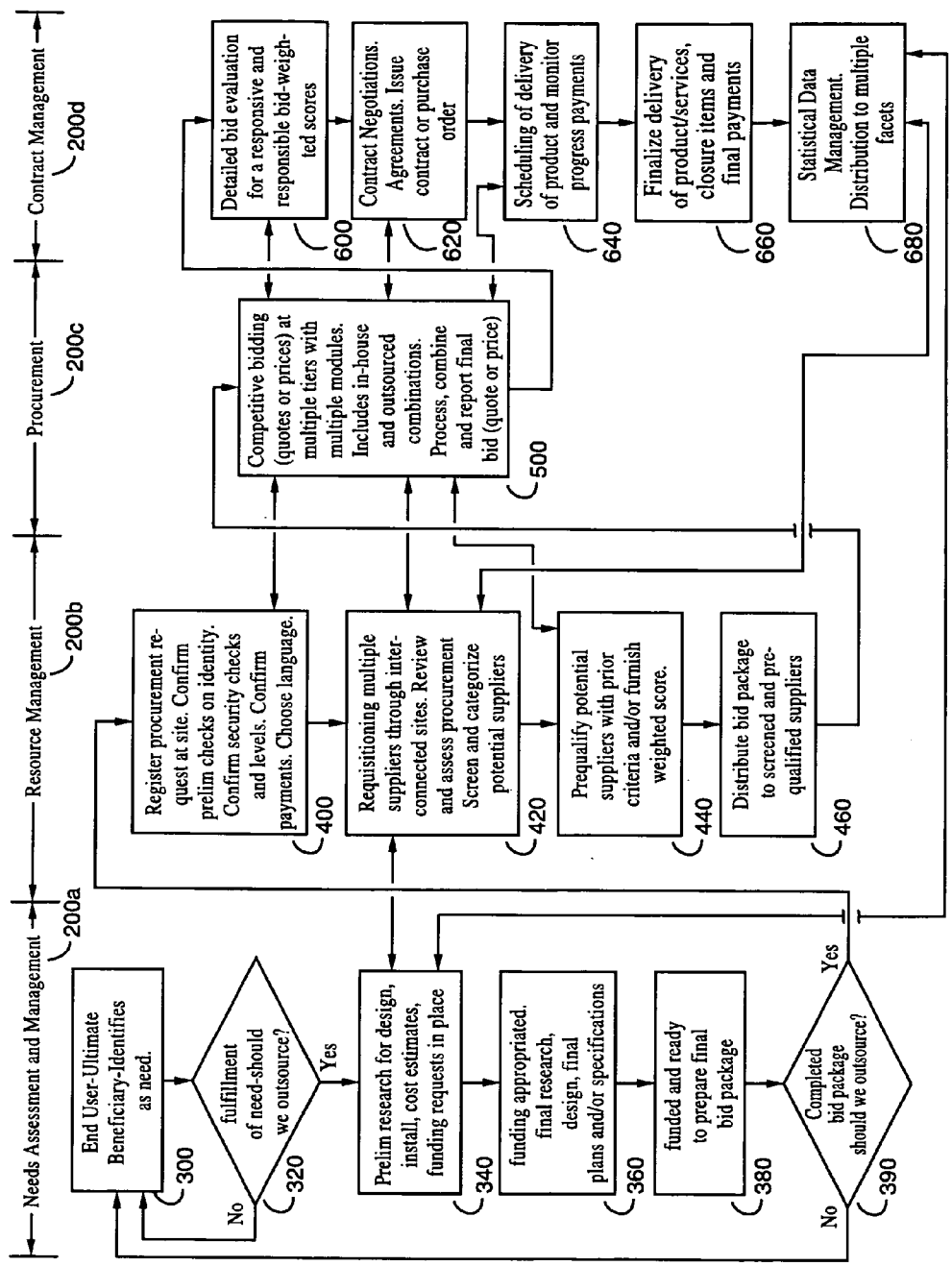
FIG. 3 shows an exemplar of the present invention.
Figure 5:
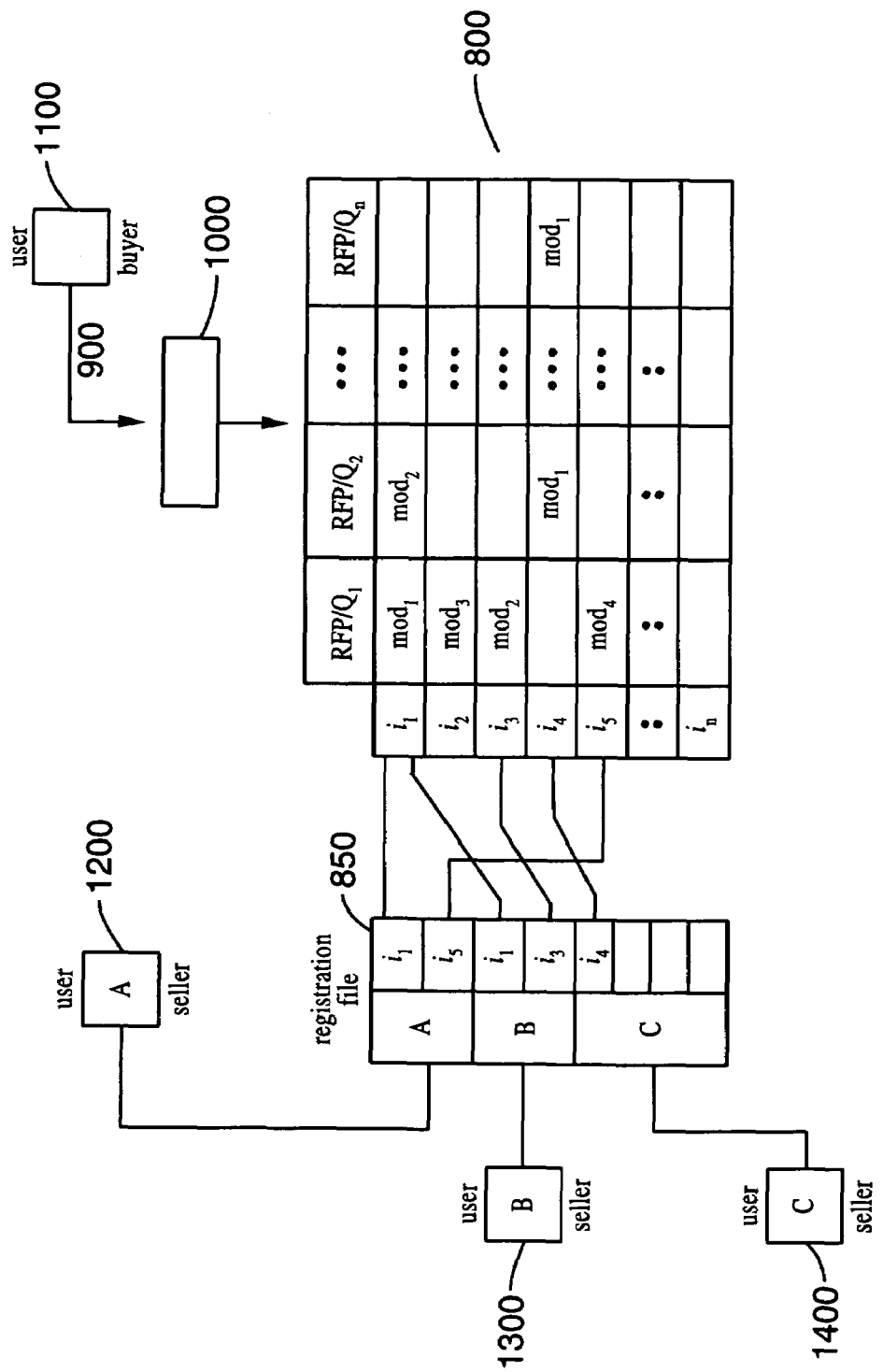
FIG. 5 shows the interactions of the users and system to achieve the perceptions shown in FIG. 4.

As shown in FIG. 5, part of the backend architecture is a relational database 800. A user-buyer 1100 would send-in their RFPs or RFQs as shown by 900. The computer system 1000 hosting the relational database would divide the RFP or RFQ into module for appropriate placement in the database and assign an index to each module that relates like modules. For example, RFP/Q1, mod1 and RFP/Q2, mod2, are related and are assigned index i1. A user-seller interested in selling goods or services through the system of the present invention would have already registered themselves as a seller and during the registration process would have selected what particular indices the seller wishes to receive RFPs or RFQs. The system of the present invention stores the indices each user-seller has registered for in a registration file 850. The user-seller could modify which indices it wishes to receive modules in at a later date. Thus, when a user-seller gains access to the system of the present invention, the system sends those jobs, modules (mod1, mod2, etc.), that are associated with the particular indices the user-seller wishes to see. For example, user-seller 1200 wishes to see only those jobs that are associated with indices i1 and which would be RFP/Q1, mod1 and mod4. While user-seller 1400 which would be RFP/Q2, mod1 and RFP/Qn, mod1. Various facets of the instant invention are used in the illustration depicted by FIG. 3. The interrelationship of the facets are described by the two-way arrowheads on both ends of a path. The single arrowhead depicts a sequential path between facets.

These facets can function either as a stand alone system or can be inserted (integrated) as an ASP (applications service provider) offered unit to a firm's existing process. The facet (or facets) can also be offered as a discrete package to be inserted in an organizations, "enterprise software system" which is an overall software designed to manage all the businesses processes. As noted in FIG. 3 the system includes four assemblies:

200 a) Needs assessment and management;

200 b) Resource management;

200 c) Procurement; and

200 d) Contract management.

The various facets are described as follows:

In Step 300, the end user and/or ultimate beneficiary identifies a need. This facet enters the system in its preliminary form and is capable of being discussed between various individuals in different parts of an organization.

In step 320, this facet combines the decisions made in step 300 and presents the option of meeting the previously—decided—need, to be fulfilled in-house (non outsourced), or outsourced. This facet has the capability to forward the "outsourced need-fulfillment" package to the next facet described in step 340.

In step 340, this facet processes the input from step 320 above and performs preliminary research and design for the need. It gives the need a form. This could be a preliminary description with or without figures, a preliminary time schedule and a preliminary cost-estimate. To accomplish its functions, this facet interacts with the facet described in step 420 (Requisitioning) as well as the facet described in step 680 (Statistical Data Management). The package created by this facet is forwarded to the next facet described in step 360.

In step 360, the input from step 340 is received and processed in this facet. This facet reviews, checks for "needs justifications", compares to the available budget—if any, forwards it to the appropriate budget approval level of authority for review—and funding. If a budget is not available then the package is sent along-with the cost estimates, for an appropriation of funding for the package. Once the preliminary description of the need, the time schedules and budgets are justified and appropriated, the package is sent to the next facet described in step 380.

In step 380, the input from step 360 is received and processed to further expand upon (if needed), and design the full details (if needed), to create a package capable of being bid. This package may range from a simple description of the needs (described in earlier steps) in words and/or diagrams, to a detailed set of design drawings and specifications. This facet creates the documents referred as a bid-package, as it is capable of being bid (and/or proceed and/or quoted). This step also submits the package for a decision which is described in the next step 390.

In step 390, this facet takes the input from the step 380 and submits it to a final approval from the end user and/or final beneficiary. The end user and/or final beneficiary also chooses if the bid package shall be procured in-house or out-sources. If the decision is to procure in-house then this facet submits the bid package to the facet described in step 300. If the decision is to outsource the bid package, then the bid package is submitted to the next facet described in step 400.

In step 400, this facet takes the input from step 390 and processes it for the end-user and/or beneficiary now referred as a buyer at Tier 0. This buyer registers with the system. The system accepts the bid package as a "job". The system checks to assure that the buyer is a registered entity with all payments in place for its own membership and for the services that it is requesting. The system checks to confirm that it can provide these services in the geographic region of the world. It confirms the languages (other than English) needed are available. It confirms the appropriate information necessary to, "take a bid out to the marketplace," e.g., opening and closing dates of bid, provisions for addendums, etc. It sets up the privacy levels and security access. The system then forwards the bid package to the next facet which is described in the step 420.

In step 420, this facet is capable of searching multiple industries and multiple sectors within industries. Buyers may enter either one central site, "Grand Central Exchange", on the world wide web (or directly through to an exchange of choice on the world wide web). This web site provides a number of general features that are of interest to the buyer as an individual and as a purchaser.

More specifically the buyer can access a specific industry exchange titled for example "Recreational Goods.com or Apparel Products.com or Mining-Minerals-Ores.com".

Within the specific site, the buyer can access specific suppliers hosted within the overall, industry-specific exchange.

Thus the buyer can browse within the buyer's industry and sector and gain information that will be helpful in deciding the buyer's specific needs. The buyer can mark the buyer's favorite suppliers for future reference. Additional methods of search can take the buyer to "linked suppliers" that are not fully represented within the industry exchange or whose web site and/or catalog is not hosted at our system's industry exchange.

In addition this facet provides the search for potential suppliers by various criteria e.g., keyword search, NAICS codes etc. This facet can also be used in conjunction with the facet described in step 340 at the preliminary research stage. This facet can, in addition send the lists of screened and categorized multiple suppliers further to the next facet described in step 440.

In step 440, this facet is capable of prequalifying the potential suppliers by a preselected criteria. The buyer chooses the criteria items and can request for a weighted score (if desired) of each supplier that was screened and furnished in step 420 above. The prequalified suppliers are then forwarded to the next facet described in step 460.

In step 460, this facet is capable of distributing the bid package to the various categories of suppliers, screened and assembled in steps 420 and 440 above. The distribution is either in electronic or physical hard copy form. The hard copy form is created by sending an electronic version and/or "original document" version to a print shop or a printer. The printer/print shop forwards the bid package to the screened and prequalified suppliers. The bid package is then sent to the next facet described in step 500.

In step 500, this facet is capable of getting competitive bids from multiple suppliers at multiple tiers. Each supplier is capable of bidding a module or group of modules sequestered from the bid package. This facet is capable of selectively receiving bids on multiple modules from selective suppliers. The facet is capable of combining the bids received at various tiers from a variety of suppliers. This facet processes, combines and reports the results of all bids from one or more sources. The buyer takes this result under advisement and forwards the results to the next facet described in step 600.

In step 600, this facet is capable of evaluating the results of the bids received in step 500. In addition to the pricing, this facet determines if the bid is "responsive" and "responsible". These two items are quantified by a set of criteria items that the buyer can assign. Each criteria item can also be assigned a weighting factor and score points. This facet can create a weighted score or simply an "acceptable", non-acceptable" result. Criteria examples are: The supplier has predetermined number of years of specific experience, the supplier has predetermined number of people on staff available to fulfill this bid, the supplier meets any unique federal government or state government requirements, the suppliers' references have responded with (excellent, good, poor) responses, etc.

This evaluation combined with the bid (pricing) result from step 500 creates the "lowest priced, most responsive and most responsible bid". The buyer may further proceed to the next facet described in step 620.

In step 620, this facet facilitates negotiations between buyer and seller based upon the earlier results from steps 500 and 600. Any special exceptions taken by the seller regarding his product, service, pricing, schedule or buyer-imposed conditions are resolved and agreed upon. This step facilitates the buyer to issue a contract and/or purchase order based on heretofore agreements. The completion of this step prompts the next step 640 to begin.

In step 640, this facet facilitates the implementation of the contract and/or purchase order agreements. It is capable of scheduling milestones for scheduled delivery of product and/or services. These milestones also monitor and prompt progress payments," as milestones are reached and the agreed-upon deliveries are accepted. This facet forwards the accumulated system data to the next step 660 as the product/services approach "substantial completion" status, determined by the buyer.

In step 660, this facet facilitates the closure of the transaction. The buyer and seller exchange information regarding final delivery of the product/services. Final acceptance is approved by the buyer upon successful delivery of all products/services, testing, warranties, certifications, "punch-list" etc., and all documentations to the satisfaction of the buyer. The system then releases the final payment to the seller and considers the transaction "closed". All information is forwarded to the next step 680.

In step 680, this facet receives information from step 660 and processes it. It stores analyzes and manages all information. This facet is capable of interacting with any or all facets concurrently. As such this facet provides additional information at any point for evaluation, comparison, information.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. An automated process for competitive bidding comprising:
   downloading into a computer a request for goods and/or services, said request defining a bid package;
   automatically sequestering said bid package into a plurality of modules, wherein a module constitutes a portion of said bid package;
   automatically further sequestering the plurality of modules into in-house and at least one outsourced module, whereby an in-house module receives an in-house bid;

automatically searching for potential suppliers for the at least one outsourced module;
automatically prequalifying the potential suppliers by a plurality of factors that generate a statistical weight to each potential supplier;
automatically selecting a set of prequalified potential suppliers based on the statistical weight attached to each potential supplier;
automatically distributing the at least one outsourced modules to each prequalified potential supplier within the set, for at least one outsourced bid,
wherein said distributing step further includes:
further sequestering the at least one outsourced modules into competitive and non-competitive modules;
releasing the competitive modules for competitive bids;
retaining the non-competitive modules for non-competitive bids; and
receiving said at least one outsourced bid, including competitive and non-competitive bids for competitive and non-competitive outsourced modules;
automatically preparing a bid from the combining of said in-house bid and all said outsourced bids, wherein each said in-house and outsourced bid has a monetary component and a non-monetary component, and each said in-house and outsourced bid is represented by a numerical value;
automatically presenting the bid as well as any additive alternatives or deductive alternatives;
automatically reporting the bid in a plurality of formats; and
automatically transmitting the bid to a sequential buyer;
wherein all said automatic steps are performed by a computer.

2. The process of claim 1 wherein the step of preparing the bid package further includes:
aggregating said competitive and non-competitive bids into the bid.

3. The process of claim 2 wherein the process is repeated until a final bid is aggregated from all of the bids.

* * * * *